(12) United States Patent
Wagoner et al.

(10) Patent No.: US 8,050,062 B2
(45) Date of Patent: Nov. 1, 2011

(54) METHOD AND SYSTEM TO ALLOW FOR HIGH DC SOURCE VOLTAGE WITH LOWER DC LINK VOLTAGE IN A TWO STAGE POWER CONVERTER

(75) Inventors: Robert Gregory Wagoner, Roanoke, VA (US); David Smith, Daleville, VA (US); Anthony William Galbraith, Wirtz, VA (US)

(73) Assignee: General Electric Company, Schenectady, NY (US)

( * ) Notice: Subject to any disclaimer, the term of this patent is extended or adjusted under 35 U.S.C. 154(b) by 8 days.

(21) Appl. No.: 12/711,466

(22) Filed: Feb. 24, 2010

(65) Prior Publication Data

US 2011/0205773 A1    Aug. 25, 2011

(51) Int. Cl.
*G05F 1/445* (2006.01)
*G05F 1/67* (2006.01)

(52) U.S. Cl. .................. 363/49; 323/906; 323/266
(58) Field of Classification Search .......... 323/906, 323/266, 901, 223, 299; 363/49, 51
See application file for complete search history.

(56) References Cited

U.S. PATENT DOCUMENTS

| | | | |
|---|---|---|---|
| 4,333,136 A * | 6/1982 | Baker | 363/43 |
| 4,404,472 A | 9/1983 | Steigerwald | |
| 4,667,283 A | 5/1987 | Seki et al. | |
| 5,280,228 A | 1/1994 | Kanouda et al. | |
| 5,384,696 A | 1/1995 | Moran et al. | |
| 5,835,353 A | 11/1998 | Dalby | |
| 5,892,675 A | 4/1999 | Yatsu et al. | |
| 6,058,035 A | 5/2000 | Madenokouji et al. | |
| 6,134,124 A | 10/2000 | Jungreis et al. | |
| 6,229,722 B1 | 5/2001 | Ichikawa et al. | |
| 6,285,572 B1 | 9/2001 | Onizuka et al. | |
| 6,291,764 B1 | 9/2001 | Ishida et al. | |
| 6,316,918 B1 | 11/2001 | Underwood et al. | |
| 6,339,538 B1 | 1/2002 | Handleman | |
| 6,369,462 B1 | 4/2002 | Siri | |

(Continued)

FOREIGN PATENT DOCUMENTS

EP            0947904 B1    10/2003
(Continued)

OTHER PUBLICATIONS

English Abstract of EP 1463188A2.

*Primary Examiner* — Harry Behm
(74) *Attorney, Agent, or Firm* — Dority & Manning, P.A.

(57) ABSTRACT

A system for supplying AC power from a DC power source, such as a photovoltaic array is disclosed. The system includes a converter and an inverter coupled by a DC link. Control methods and systems are provided to maintain the DC source voltage and the DC link voltage below the open-circuit voltage of the DC power source. During steady state conditions, the DC source voltage and the DC link voltage are maintained below the open-circuit voltage of the DC power source by controlling the output of the inverter. The DC link voltage is temporarily adjusted to allow for higher DC link transients when the DC power source is first coupled or re-coupled to the system. During conditions when the inverter is decoupled from the system, the converter is controlled to maintain the DC link voltage below the open-circuit voltage of the DC power source.

18 Claims, 6 Drawing Sheets

U.S. PATENT DOCUMENTS

| | | | |
|---|---|---|---|
| 6,373,731 B1 | 4/2002 | Iwamura et al. | |
| 6,380,719 B2 | 4/2002 | Underwood et al. | |
| 6,411,065 B1 | 6/2002 | Underwood et al. | |
| 6,452,289 B1 | 9/2002 | Lansberry et al. | |
| 6,593,520 B2 * | 7/2003 | Kondo et al. | 136/244 |
| 6,690,589 B2 | 2/2004 | Barnett et al. | |
| 6,693,809 B2 | 2/2004 | Engler | |
| 6,765,315 B2 | 7/2004 | Hammerstrom et al. | |
| 6,809,942 B2 | 10/2004 | Madenokouji et al. | |
| 6,853,940 B2 | 2/2005 | Tuladhar | |
| 6,914,418 B2 | 7/2005 | Sung | |
| 6,940,735 B2 | 9/2005 | Deng et al. | |
| 6,963,147 B2 | 11/2005 | Kurokami et al. | |
| 6,979,980 B1 | 12/2005 | Hesterman et al. | |
| 6,984,960 B2 * | 1/2006 | Stancu et al. | 318/801 |
| 7,015,597 B2 | 3/2006 | Colby et al. | |
| 7,072,194 B2 | 7/2006 | Nayar et al. | |
| 7,099,169 B2 | 8/2006 | West et al. | |
| 7,119,452 B2 | 10/2006 | Larsen | |
| 7,120,039 B2 | 10/2006 | Burger et al. | |
| 7,145,266 B2 | 12/2006 | Lynch et al. | |
| 7,158,395 B2 | 1/2007 | Deng et al. | |
| 7,183,667 B2 | 2/2007 | Colby et al. | |
| 7,193,872 B2 | 3/2007 | Siri | |
| 7,239,036 B2 | 7/2007 | D'Atre et al. | |
| 7,256,566 B2 | 8/2007 | Bhavaraju et al. | |
| 7,319,313 B2 | 1/2008 | Dickerson et al. | |
| 7,324,361 B2 | 1/2008 | Siri | |
| 7,333,349 B2 | 2/2008 | Chang et al. | |
| 7,333,352 B2 | 2/2008 | Petter et al. | |
| 7,338,311 B2 | 3/2008 | Laschinksi et al. | |
| 7,339,287 B2 | 3/2008 | Jepsen et al. | |
| 7,397,653 B2 | 7/2008 | Taylor | |
| 7,405,496 B2 | 7/2008 | Wagoner et al. | |
| 7,411,802 B2 | 8/2008 | Victor et al. | |
| 7,414,870 B2 | 8/2008 | Röttger et al. | |
| 7,423,894 B2 | 9/2008 | Ilic | |
| 7,432,618 B2 | 10/2008 | Taylor | |
| 7,433,215 B2 | 10/2008 | Taylor et al. | |
| 7,443,052 B2 | 10/2008 | Wendt et al. | |
| 7,463,489 B2 | 12/2008 | Falk et al. | |
| 7,463,500 B2 | 12/2008 | West | |
| 7,471,073 B2 | 12/2008 | Bettenwort et al. | |
| 7,479,774 B2 | 1/2009 | Wai et al. | |
| 2006/0097578 A1 | 5/2006 | Baldwin et al. | |
| 2006/0103341 A1 | 5/2006 | Steigerwald et al. | |
| 2007/0024059 A1 | 2/2007 | D'Atre et al. | |
| 2007/0100506 A1 | 5/2007 | Teichmann | |
| 2007/0236187 A1 | 10/2007 | Wai et al. | |
| 2007/0252716 A1 | 11/2007 | Burger | |
| 2007/0273338 A1 | 11/2007 | West | |
| 2008/0094867 A1 | 4/2008 | Muller et al. | |
| 2008/0101101 A1 | 5/2008 | Iwata et al. | |
| 2008/0122293 A1 | 5/2008 | Ohm | |
| 2008/0150366 A1 | 6/2008 | Adest et al. | |
| 2008/0180979 A1 | 7/2008 | Taylor et al. | |
| 2008/0192510 A1 | 8/2008 | Falk | |
| 2008/0197825 A1 | 8/2008 | Siri | |
| 2008/0232145 A1 | 9/2008 | Hiller et al. | |
| 2008/0257397 A1 | 10/2008 | Glaser et al. | |
| 2008/0290252 A1 | 11/2008 | Leonhardt et al. | |
| 2008/0291706 A1 | 11/2008 | Seymour et al. | |
| 2008/0304302 A1 | 12/2008 | Wagoner et al. | |
| 2009/0003024 A1 | 1/2009 | Knaup | |
| 2009/0046491 A1 | 2/2009 | Zacharias et al. | |
| 2009/0046492 A1 | 2/2009 | Zacharias et al. | |
| 2009/0177333 A1 | 7/2009 | Delmerico | |

FOREIGN PATENT DOCUMENTS

| | | | |
|---|---|---|---|
| EP | 1463188 A2 | 9/2004 | |
| EP | 1861914 B1 | 12/2008 | |
| EP | 1178596 B1 | 2/2009 | |
| JP | 60261360 A | * 12/1985 | |
| WO | WO 2008/015298 A1 | 2/2008 | |
| WO | WO 2008/096019 A1 | 8/2008 | |

* cited by examiner

METHOD AND SYSTEM TO ALLOW FOR HIGH DC SOURCE VOLTAGE WITH LOWER DC LINK VOLTAGE IN A TWO STAGE POWER CONVERTER

FIELD OF THE INVENTION

The present invention relates generally to the field of solar power generation and, more particularly, to methods and systems to allow for a high DC source voltage in a solar power converter system.

BACKGROUND OF THE INVENTION

Solar power generation is becoming a progressively larger source of energy throughout the world. Solar power generation systems typically include one or more photovoltaic arrays (PV arrays) having multiple interconnected solar cells that convert solar energy into DC power through the photovoltaic effect. In order to interface the output of the PV arrays to a utility grid, a power converter system is used to change the DC current and DC voltage output of the PV array into a 60/50 Hz AC current waveform that feeds power to the utility grid.

Various power converter systems exist for interfacing the DC output of a PV array (or other DC power source) with the AC grid. One implementation of a power converter system includes two stages, a boost converter stage and an inverter stage. The boost converter stage controls the flow of DC power from the PV array to a DC bus or DC link (hereinafter referred to as the "DC link"). The inverter stage converts the power supplied to the DC link into a suitable AC waveform that can be output to the AC grid.

Many situations arise in which it is necessary to accommodate a PV array (or other DC power source) that has a high open-circuit voltage, such as an open-circuit voltage of about 1000 $V_{DC}$ or more. In such situations, it is desirable to have a power converter system that operates at a PV array source voltage and a DC link voltage that is less than the open-circuit voltage of the PV array. This is primarily because power electronic devices that are used in the power converter system, such as insulated gate bipolar transistors (IGBTs), are typically selected to accommodate the maximum power voltage of the PV array, not the open-circuit voltage of the PV array.

For instance, FIG. 1 illustrates a typical voltage-current curve 10 (hereinafter referred to as a "V-I curve") for a PV array at a particular temperature and irradiance. FIG. 2 illustrates a typical power curve 20 for a PV array at a particular temperature and irradiance. The maximum power point for the PV array occurs at the current indicated by dashed line 12 in FIGS. 1 and 2. The voltage of the PV array at dashed line 12 is the maximum power voltage for the PV array. Point 14 of FIG. 1 represents the open-circuit voltage (voltage when the current zero) of the PV array. As illustrated, the maximum power voltage of the PV array is typically less than the open-circuit voltage of the PV array.

If the power converter system operates at a PV array source voltage or DC link voltage substantially equal to or greater than the open-circuit voltage of the PV array, the power converter system would require higher rated power electronic devices. Higher rated power electronic devices are typically more expensive and have higher conduction losses, leading to reduced efficiency. Moreover, the use of power electronic devices rated for a voltage higher than the maximum power voltage results in reduced operating efficiency. Thus, there is a need to have a power converter system that operates at a PV array source voltage and a DC link voltage that is less than the open-circuit voltage of the PV array.

Once a two-stage power converter system is running in steady state conditions, the inverter can regulate the DC link voltage such that the DC link voltage is less than the PV array open-circuit voltage. However, during startup or during other transient conditions when the PV array is first coupled, decoupled, or re-coupled to the converter, the power converter system may have to temporarily accommodate an open-circuit voltage or other high source voltage of the PV array. The transient conditions may cause the DC link voltage or the PV array source voltage to go above an over-voltage trip point for the power converter system, leading to damage or to disconnection of the PV array from the power converter system.

Thus, there is a need for a method and system to allow for a high source voltage in a power converter system during startup, shutdown, or other transient condition that maintains the DC link voltage and the PV array source voltage less than the open-circuit voltage of the PV array.

BRIEF DESCRIPTION OF THE INVENTION

Aspects and advantages of the invention will be set forth in part in the following description, or may be obvious from the description, or may be learned through practice of the invention.

One exemplary embodiment of the present disclosure is directed to a control method for a power converter system. The power converter system includes a converter configured to provide DC power from a DC power source, an inverter configured to convert the DC power provided by the converter to AC power, and a DC link having a DC link voltage coupling the converter and the inverter. The method includes operating the DC link voltage of the DC link at a first DC link voltage; generating an open-circuit voltage at the DC power source; adjusting the DC link voltage from the first DC link voltage to a second DC link voltage, the second DC link voltage being less than the first DC link voltage; coupling the DC power source to the power converter system; providing DC power to the DC link from the DC power source; and, converting the DC power on the DC link to AC power.

Another exemplary embodiment of the present disclosure is directed to a power system. The power system includes a converter configured to provide DC power from a DC power source, an inverter configured to convert the DC power provided by the converter to AC power, and a DC link having a DC link voltage coupling the converter and the inverter. The power system further includes a control system configured to control the DC link voltage of the DC link. The control system is configured to adjust the DC link voltage before or during a transient condition, such as before or during the coupling, decoupling, or re-coupling of the DC power source to the power system, to maintain the DC link voltage less than an open-circuit voltage for the DC power source.

A further exemplary embodiment of the present disclosure is directed to a control method for a power converter system. The power converter system includes a converter configured to provide DC power from a DC power source, an inverter configured to convert the DC power provided by the converter to AC power, and a DC link having a DC link voltage coupling the converter and the inverter. The method includes providing DC power to the DC link from the DC power source; converting the DC power of the DC link to AC power; controlling the DC link voltage to be less than the open-circuit voltage of the DC power source by controlling the output of the inverter; decoupling the DC power source from the power converter system; and operating the converter to maintain the DC link voltage less than the open-circuit voltage of the DC power source.

Variations and modifications can be made to these exemplary embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE DRAWINGS

Figure 1:
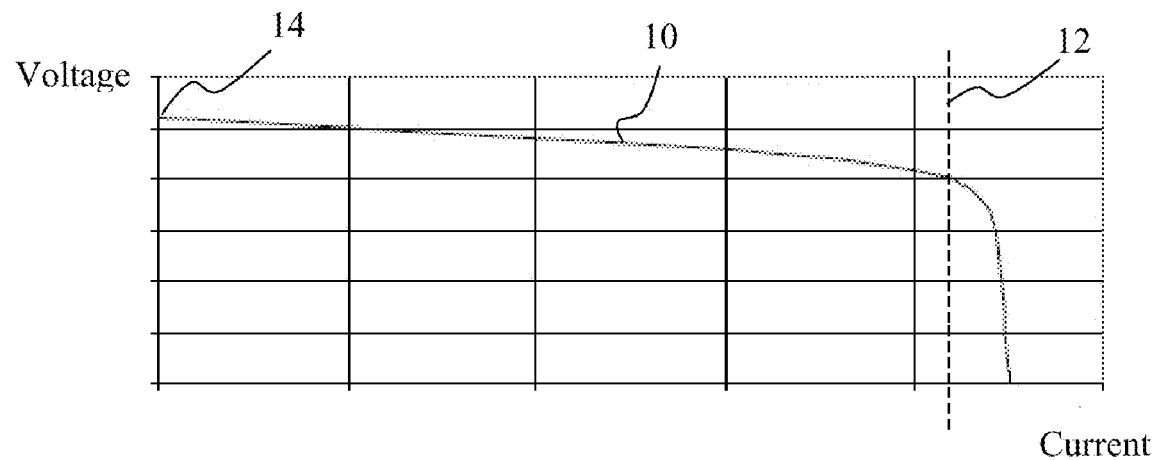
FIG. 1 provides an exemplary V-I curve for a PV array at a particular temperature and irradiance.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention encompass such modifications and variations as come within the scope of the appended claims and their equivalents.

Generally, the present disclosure is directed to methods and apparatus for supplying AC power to an AC power grid from a DC power source, such as a PV array. The methods and systems discussed herein are made with reference to a power converter for converting DC power supplied from a PV array. However, those of ordinary skill in the art, using the disclosures provided herein, should understand that the methods and systems of the present disclosure can be used with any DC power source without deviating from the scope of the present invention.

Figure 3:
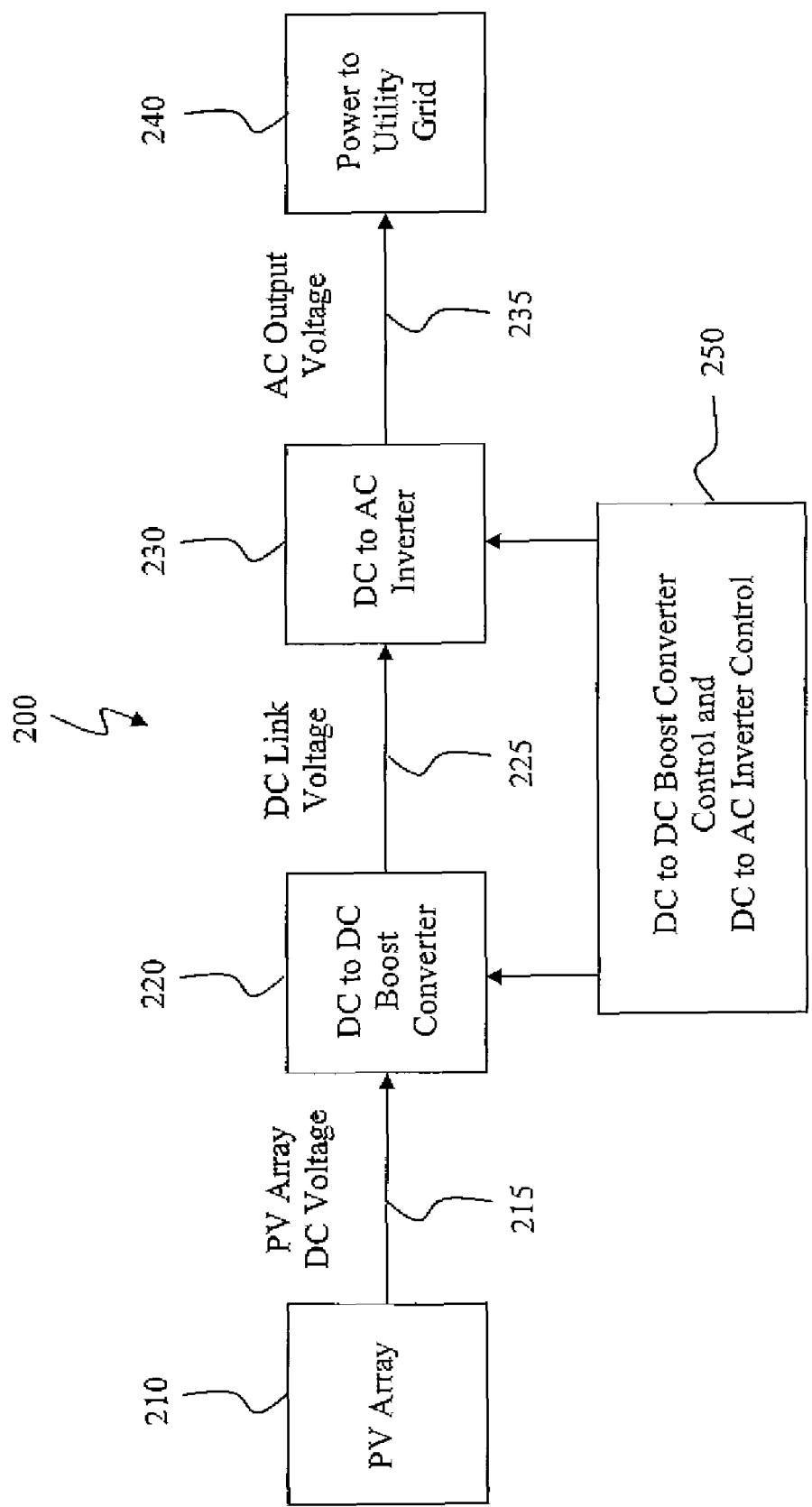
FIG. 3 provides a block diagram of a power system according to an exemplary embodiment of the present disclosure.

FIG. 3 depicts a conceptual block diagram of an exemplary two stage power converter system 200 used to convert DC power 215 generated by a PV array 210 into AC power 235 suitable for feeding an AC power grid 240. The first stage of power converter system 200 can include a DC to DC converter 220, such as a boost converter, that provides DC power 225 to a DC link. The DC link couples the DC to DC converter 220 to an inverter 230 which operates as the second stage of the power converter 200. Inverter 230 converts the DC power 225 on the DC link to AC power 235 suitable for being supplied to an AC power grid 240. DC to DC converter 220 can be a part of or integral with inverter 230 or can be a separate stand alone structure from inverter 230. In addition, more than one converter 220 can be coupled to the same inverter 230 through one or more DC links.

Power converter system 200 includes a control system 250 that is configured to control both the DC to DC boost converter 220 and the DC to AC inverter 230. For instance, control system 250 can be configured to regulate the output of the DC to DC converter 220 pursuant to a control method that adjusts the duty cycle (switching speed) of the switching devices (IGBTs or other power electronic devices) used in the DC to DC converter 220. Control system 250 can also be configured to regulate the output of inverter 230 by varying the modulation commands provided to inverter 230. The modulation commands control the pulse width modulation of the inverter 230 and can be used to vary the real and reactive power output of the inverter 230.

When power converter system 200 is operating in steady state conditions, control system 250 can regulate the DC link voltage of the DC link (and, correspondingly, the PV array source voltage of the PV array 210) by adjusting the AC output of inverter 230. For instance, control system 250 can regulate the DC link voltage of the DC link by controlling the AC current output of inverter 230. In steady state conditions, the inverter 230 is typically controlled to provide real power flow (i.e., the real part of the vector product of the inverter output AC voltage and the inverter output AC current) to the AC grid 240 that is equal to the power supplied to the DC link by DC to DC converter 220. Varying the output AC current of the inverter 230 will result in a change to the output AC voltage of the inverter 230, based on the impedance of the output transformer and the utility grid. Adjusting the output AC voltage of the inverter 230 will correspondingly induce a change in the DC link voltage of the DC link.

In situations in which it is necessary to accommodate a PV array 210 (or other DC power source) having a high open-circuit voltage, it is desirable to maintain the DC link voltage less than the open-circuit voltage of the PV array 210. By maintaining the DC link voltage less than the open-circuit voltage of the PV array 210, the PV array source voltage provided by the PV array 210 to the power converter system 200 can also be maintained less than the open-circuit voltage of the PV array 210, such as at the maximum power voltage of the PV array 210. In steady-state conditions, the control system 250 can regulate the DC link voltage to be less than the open-circuit voltage of the PV array 210 by controlling the output of inverter 230.

Figure 4:
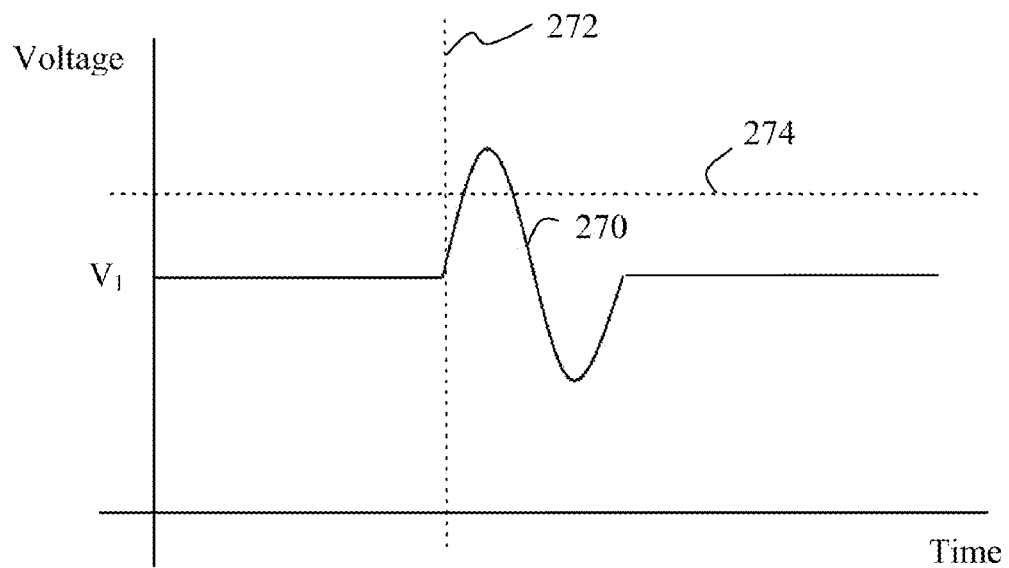
FIG. 4 provides a graphical representation of DC link voltage plotted versus time.

During transient conditions, when the PV array 210 is first coupled, decoupled, or re-coupled to the power converter system 200, the DC link voltage may transiently move above an over-voltage trip point for the power converter system 200, leading to damage or to disconnection (through opening of a circuit breaker, contact, relay, switch, or other device) of the PV array 210 from the power converter system 200. For example, FIG. 4 provides a graphical representation of a DC link voltage curve 270 plotted versus time. The DC link voltage is controlled to operate at a first voltage $V_1$. At time 272, PV array 210 having a high open-circuit voltage is coupled to the power converter system 200. As illustrated, the DC link voltage moves above an over-voltage trip point indicated by dashed line 274. This can lead to damage to the power converter system 200 or to disconnection of the PV array 210 from the power converter system 200 through opening of a circuit breaker, contact, relay, switch, or other device.

Figure 5:
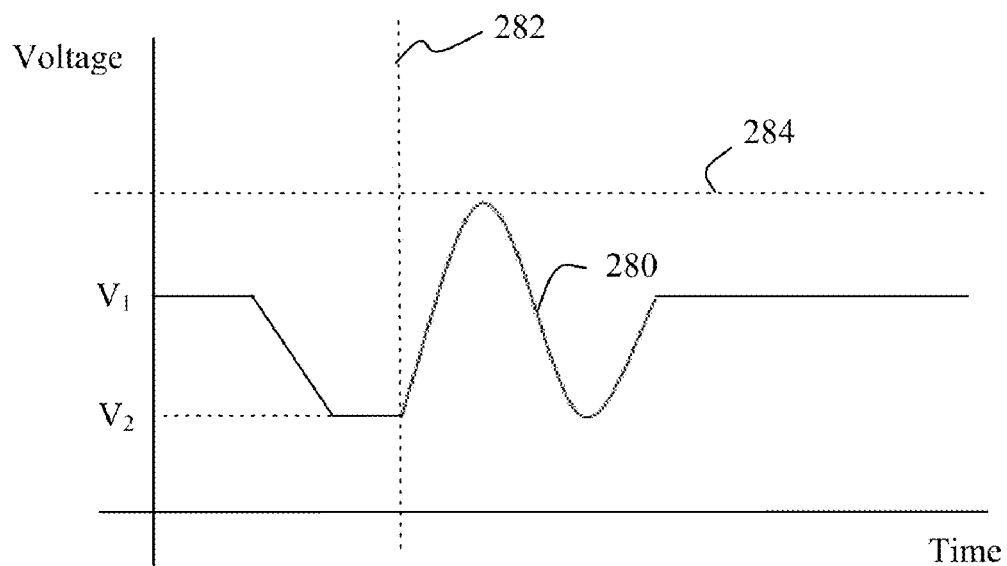
FIG. 5 provides a graphical representation of DC link voltage plotted versus time for a power system according to an exemplary embodiment of the present disclosure.

To address this concern, embodiments of the present disclosure temporarily adjust the DC link voltage of the DC link so that the DC link voltage can withstand any voltage surges during the transient conditions. For example, as illustrated in FIG. 5, the DC link voltage represented by curve 280 is adjusted from a first voltage $V_1$ to a second voltage $V_2$. When the PV array 210 is coupled to the power converter system 200 at time 282, the DC link voltage temporarily increases. However, the DC link voltage never reaches the over-voltage trip point 284 for the power converter system 200. In this manner, the power converter system 200 can accommodate a PV array 210 with a high open-circuit voltage. In particular embodiments, the DC link voltage may be temporarily lowered by overmodulating the inverter 230 or by inputting reactive power to the inverter 230.

Situations can also arise in which the PV array 210 becomes decoupled from the power converter system 200, such as, for instance, during shut down conditions or during a trip condition. For instance, the PV array 210 can become decoupled by opening a circuit breaker, contact, relay, switch, or other device located between the PV array 210 and the power converter system. The circuit breaker, contact, relay, switch, or other device can have a relatively long trip/opening time, such as, for example, a few hundred milliseconds. In such conditions, embodiments of the present disclosure control the operation of the converter 220 to maintain the DC link voltage less than the open-circuit voltage of the PV array 210.

For example, the control system 250 can regulate the DC link voltage by shorting the PV array 210 through switching devices (IGBTs or other power electronic devices) used in converter 220. The switching devices of the converter 220 can be turned on in a few microseconds and provide a much faster response than the circuit breaker, contact, relay, switch, or other device during a shut down condition or a trip condition. The control system 250 can control the duty cycle or switching speed of the switching devices in converter 220 to regulate the current flowing from the PV array 210 and maintain the DC link voltage less than the open-circuit voltage of the PV array.

Figure 6:
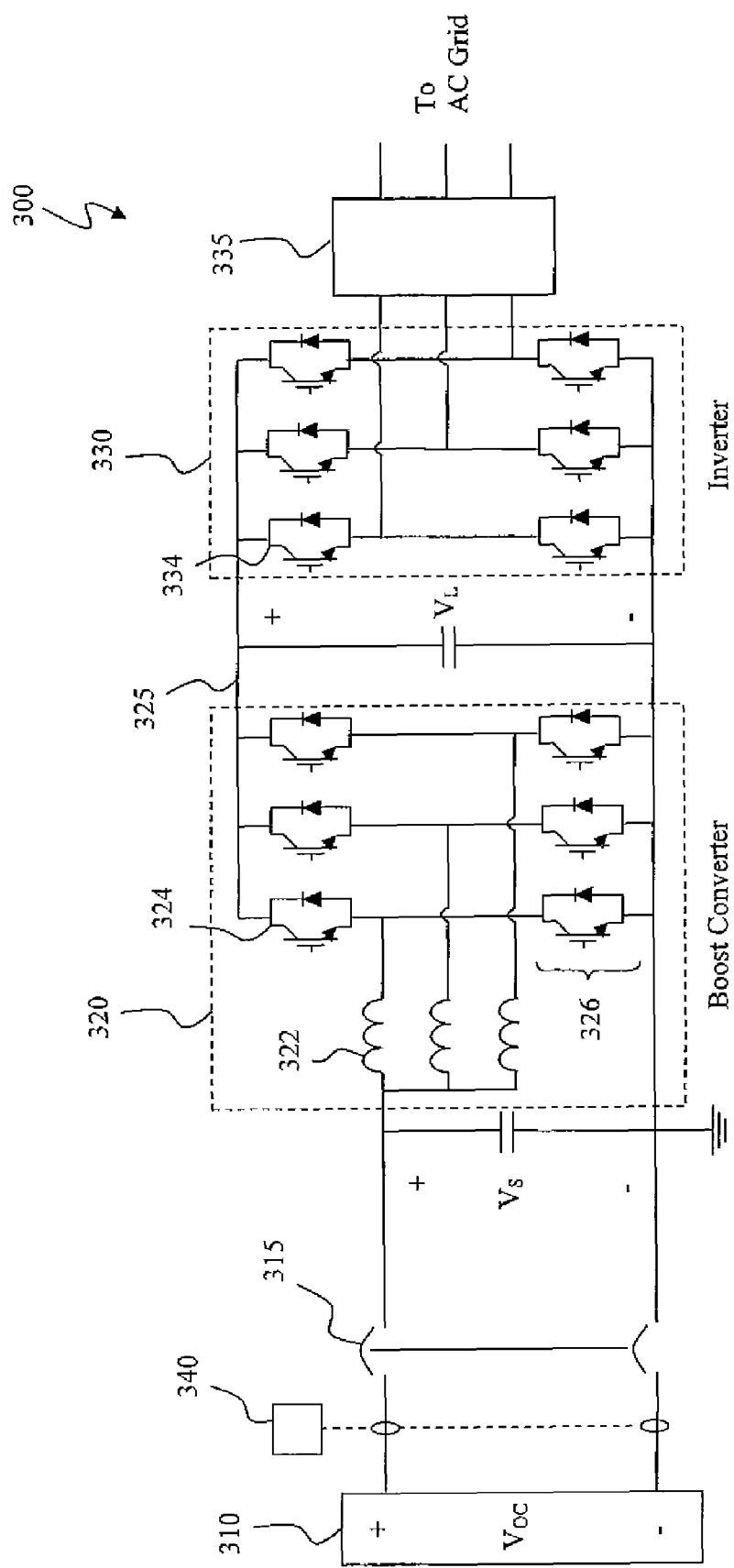
FIG. 6 provides a circuit diagram of a power system according to an exemplary embodiment of the present disclosure.

Referring now to FIG. 6, a circuit diagram for an exemplary two stage power converter system 300 will now be discussed in detail. A PV array 310 has a plurality of interconnected solar cells that produce a DC voltage and a DC current in response to solar energy incident on the PV array 310. When no current flows from the PV array 310, the PV array 310 provides an open-circuit voltage $V_{OC}$. The open-circuit voltage $V_{OC}$ can be greater than the voltage ratings of the power electronic devices and/or other circuit elements used in power converter system 300.

The PV array 310 can be coupled to power converter system 300 by circuit breaker 315. When circuit breaker 315 is open, no current will flow from PV array 310 and the PV array will generate open-circuit voltage $V_{OC}$. When circuit breaker 315 is closed, current will flow from PV array 310 to the power converter system 300. The PV array source voltage $V_S$ provided to the power converter system will vary depending on the current provided by the PV array 310. FIG. 1 illustrates a V-I curve showing the relationship between voltage and current for a typical PV array 310.

Preferably, the PV array source voltage $V_S$ is less than the open-circuit voltage $V_{OC}$ of the PV array 310. For instance, in particular embodiments, the PV array source voltage $V_S$ is preferably maintained at the maximum power voltage for the PV array 310. The PV array source voltage $V_S$ can be regulated by controlling the output of boost converter 320 and/or inverter 330.

Figure 2:
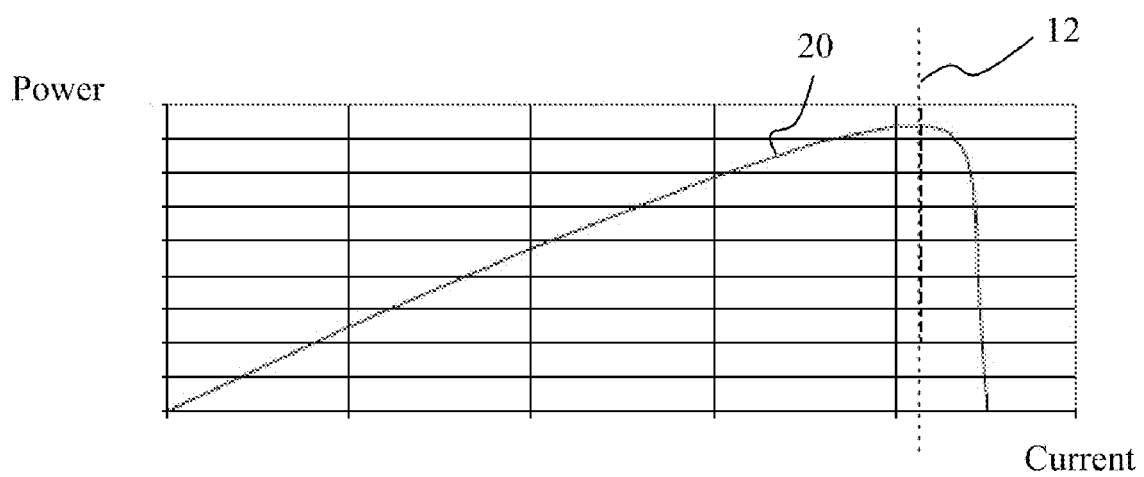
FIG. 2 provides an exemplary power curve for a PV array at a particular temperature and irradiance.

Boost converter 320 is configured to receive the DC power from PV array 310 and provide DC power to the DC link 325. Boost converter 320 boosts the PV array source voltage $V_S$ to a higher DC link voltage $V_L$ and controls the flow of DC power onto DC link 325. While a boost converter 320 is depicted in FIG. 2, those of ordinary skill in the art will understand, using the disclosures provided herein, that any form of DC to DC converter configured to regulate the DC power provided to DC link 325 can be used in power system 300 without deviating from the scope of the present disclosure. For instance, the DC to DC converter can be a boost converter, buck converter, or buck/boost converter.

Boost converter 320 includes inductive elements 322 and a plurality of switching devices 324. The switching devices 324 can include one or more power electronic devices such as IGBTs. Boost converter 320 controls the flow of DC power onto DC link 325 by regulating either the DC input current or DC input voltage to DC link 325. In particular embodiments, boost converter 320 is controlled by sending gate timing commands to the switching devices 324 used in boost converter 320.

DC link 325 couples boost converter 320 to inverter 330. DC link 325 can include one or more capacitors to provide stability. DC link 325 operates at a DC link voltage $V_L$. The control system can regulate the DC link voltage $V_L$ by controlling the output of inverter 330. While the boost converter 320 is delivering power to the DC link 325, the DC link voltage $V_L$ is maintained proportional to the PV array source voltage $V_S$ according to the duty cycle of boost converter 320. A change in DC link voltage $V_L$ will correspondingly induce a change in PV array source voltage $V_S$. In this regard, the PV array source voltage $V_S$ can be regulated by controlling the DC link voltage $V_L$.

Inverter 330 converts the DC power of DC link 325 into AC power that is suitable for being fed to an AC power grid through one or more filters 335. FIG. 3 illustrates a three-phase AC output for inverter 330. However, those of ordinary skill in the art, using the disclosures provided herein, should readily understand that inverter 330 can similarly provide a single-phase AC output or other multi-phase AC output as desired without deviating from the scope of the present invention.

Inverter 330 uses one or more inverter bridge circuits 334 that include power devices, such as IGBTs and diodes that are used to convert the DC power on DC link 325 into a suitable AC waveform. For instance, in certain embodiments, inverter 330 uses pulse-width-modulation (PWM) to synthesize an output AC voltage at the AC grid frequency. The output of inverter 330 can be controlled by providing gate timing commands to the IGBTs of the inverter bridge circuits 334 of inverter 330 according to well known PWM control techniques. The output AC current flowing from inverter 330 has components at the PWM chopping frequency and the grid frequency.

Power converter system 300 may also include a PV array voltage sensor 340. PV array voltage sensor 340 monitors the voltage of the PV array 310 and provides feedback signals to a control system. The control system can make adjustments to the DC link voltage or other operating parameters of power converter system 300 based on the PV array voltage detected by PV array voltage sensor 340.

During steady state conditions, a control system can regulate the DC link voltage $V_L$ by adjusting the AC output of inverter 330. As will be discussed in detail below, the control system can also be configured to regulate the DC link voltage $V_L$ to absorb any voltage surges that may occur during transient conditions, such as when the PV array 310 is first coupled, decoupled, or re-coupled to the power converter system 300.

Figure 7:
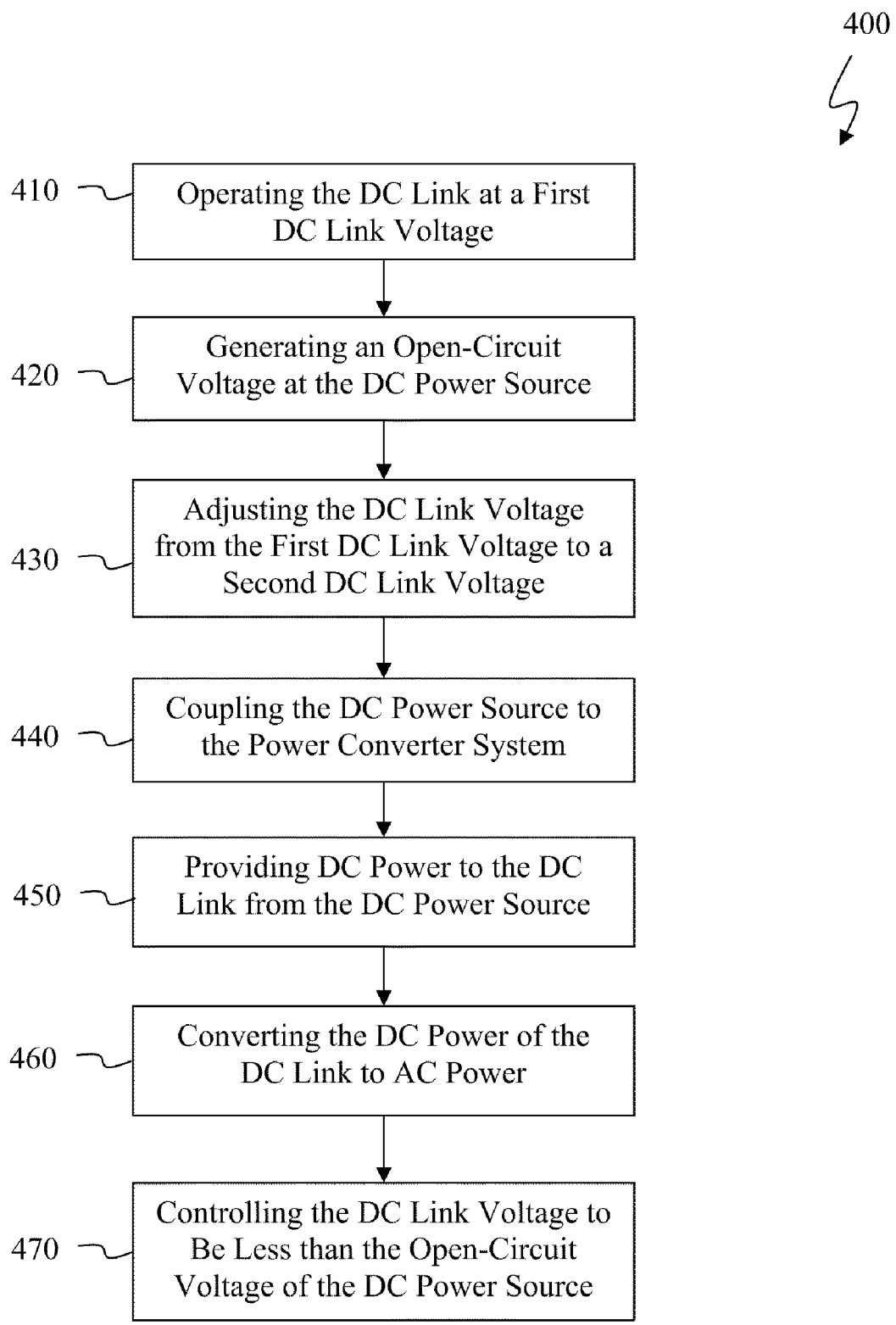
FIG. 7 depicts a flow diagram of an exemplary method according to one exemplary embodiment of the present disclosure; and, FIG. 8 depicts a flow diagram of an exemplary method according to another exemplary embodiment of the present disclosure.

FIG. 7 illustrates a flow diagram of an exemplary control method 400 for exemplary power converter system 300. At 410, a control system operates the DC link 325 so that DC link voltage $V_L$ is equal to a first DC link voltage. First DC link voltage is preferably less than the open-circuit voltage $V_{OC}$ of PV array 310. The control system can operate DC link 325 at a first DC link voltage by controlling the AC output of inverter 330. PV array voltage sensor 340 can be used to determine if PV array 310 is operating at an open-circuit voltage or other voltage.

At 420, an open-circuit voltage is generated at PV array 310 (or other DC power source). In one embodiment, the open-circuit voltage can be generated because the PV array 310 has not yet been coupled to the power converter system 300. For instance, circuit breaker 315 can be in an open position, preventing current from flowing from the PV array 310 to the converter 320. In this situation, PV array 310 will generate an open-circuit voltage $V_{OC}$. In another embodiment, the PV array can generate an open-circuit voltage $V_{OC}$ because the circuit breaker 315 has tripped to an open position.

At 430, in anticipation of coupling or re-coupling PV array 310 to the converter 320, a control system can adjust the DC link voltage $V_L$ from the first DC link voltage to a second DC link voltage. The second DC link voltage is preferably less than the first DC link voltage so that the DC link can absorb the voltage surge provided by coupling or re-coupling the PV array 310 to the converter 320.

In one embodiment, the control system can temporarily lower the DC link voltage $V_L$ from the first DC link voltage to the second DC link voltage by overmodulating the inverter 330. Overmodulating the inverter 330 includes adjusting the gate timing commands of the inverter 330 so that the peak AC voltage of the AC output of inverter 330 is greater than the DC link voltage $V_L$. In this condition, if power flow and AC output voltage of inverter 330 remains constant, the DC link voltage $V_L$ will be reduced from the first DC link voltage to the second DC link voltage.

In another embodiment, the control system can temporarily lower the DC link voltage by inputting reactive power into the inverter 330 from the AC grid. This will also induce a temporary reduction in DC link voltage $V_L$ from the first DC link voltage to the second DC link voltage. By reducing the DC link voltage $V_L$, the power converter system 300 will be ready to withstand any voltage surges caused during transient conditions when the PV array 310 is coupled to the converter 320.

At 440, the method 400 includes coupling the PV array 310 to the power converter system 300. The PV array 310 can be coupled to the power converter system 300 during start up conditions or after being decoupled from the power converter system 300 during a shut down condition or trip condition. In a particular embodiment, PV array 310 can be coupled to converter system 300 by closing circuit breaker 315.

At 450, the method 400 includes providing DC power to the DC link 325 from PV array 310. Converter 320 can be controlled to provide DC power to the DC link 325 from PV array 310. For example, a control system can regulate the duty cycle of switching devices 324 used in converter 320 to control the DC power provided to DC link 325.

At 460, the method includes converting the DC power of the DC link 325 to AC power. Inverter 330 can be controlled to convert the DC power of the DC link 325 to AC power. For example, a control system can provide modulation commands that control the pulse width modulation of the inverter 330 and to vary the real and reactive power output of inverter 330.

At 470, the method 400 includes controlling the DC link voltage $V_L$ to be less than the open-circuit voltage $V_{OC}$ of the PV array 310. As discussed in detail above, a control system can control the DC link voltage $V_L$ to be less than the open-circuit voltage $V_{OC}$ of the PV array 310 by regulating the output of inverter 330. By controlling the DC link voltage $V_L$ to be less than the open-circuit voltage $V_{OC}$ of the PV array 310, the PV array source voltage $V_S$ is also maintained less than the open-circuit voltage $V_{OC}$ of the PV array 310, such as at the maximum power voltage for the PV array. In this manner, a power converter system 300 can accommodate a high open-circuit PV array 310 without having to use higher rated power electronic devices, such as higher rated IGBTs, in the power converter system 300.

Figure 8:
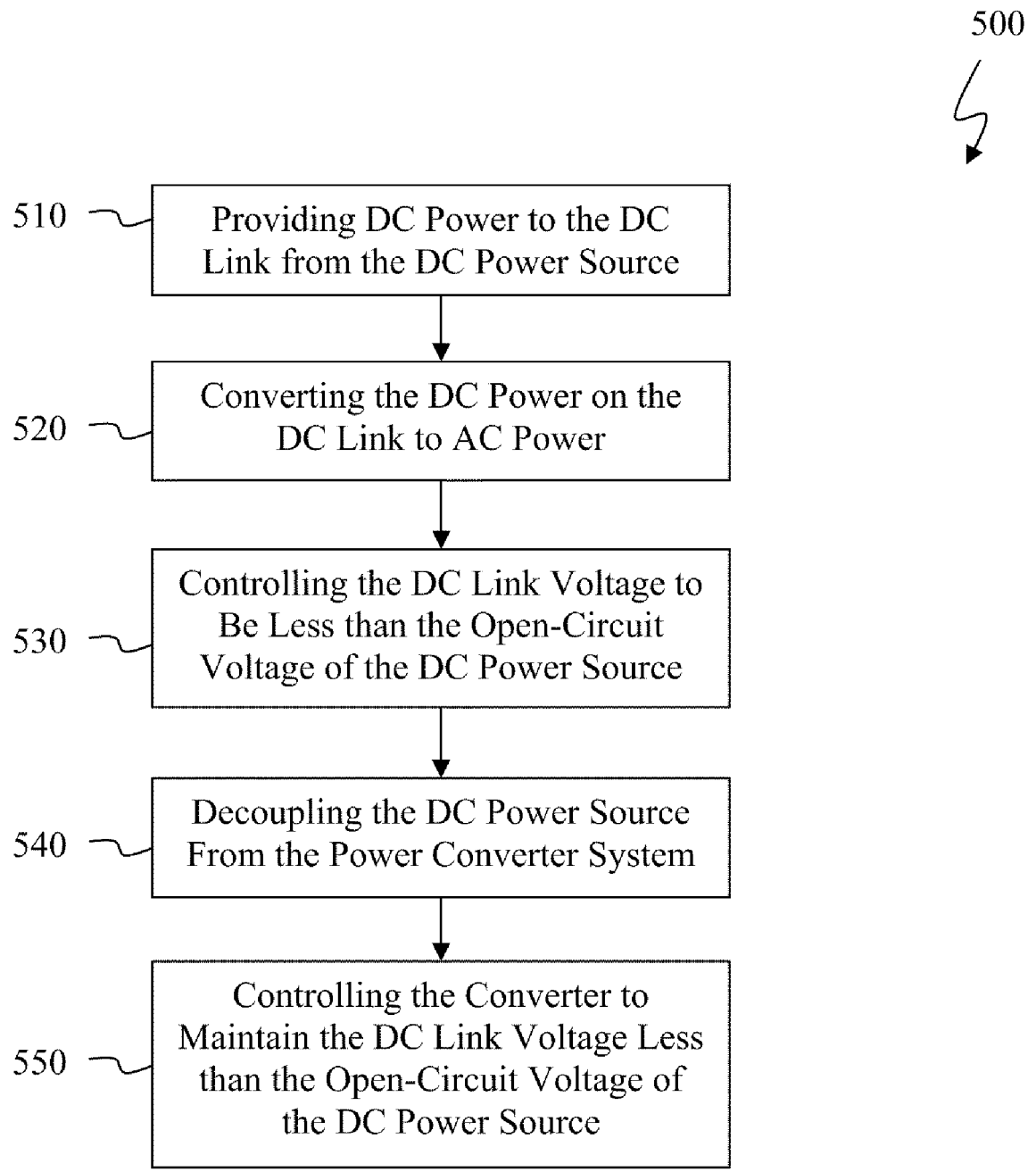

In certain circumstances, PV array 310 can become decoupled from the power converter system 300, such as, for instance, during shut down conditions or during a trip condition. For example, circuit breaker 315 can trip to an open position because of a voltage surge or other transient condition. The circuit breaker open/trip time can be large, such as a few hundred milliseconds. FIG. 8 illustrates a flow diagram of an exemplary control method 500 for maintaining the DC link voltage $V_L$ less than the open-circuit voltage $V_{OC}$ of the PV array 310 as the circuit breaker 315 is opening.

At 510, the method 500 includes providing DC power to the DC link 325 from PV array 310. At 520, the method includes converting the DC power of the DC link 325 to AC power. At 530, the method 500 includes controlling the DC link voltage $V_L$ to be less than the open-circuit voltage $V_{OC}$ of the PV array 310.

At 540, the PV array 310 becomes decoupled from the power converter system. The PV array 310 can become decoupled from the power converter system due to a shut down condition or due to a trip condition. At 550, a control system operates the converter 320 to maintain the DC link voltage $V_L$ less than the open-circuit voltage $V_{OC}$ of the PV array 310 as the PV array 310 is decoupled from the converter 320.

For example, in one embodiment, the PV array 310 is shorted through switching devices 326 in converter 320. By shorting the PV array 310 through switching devices 326, a current path is provided through converter 320 between the PV array 310 and a ground G or other reference. The current path allows current to flow from the PV array 310, maintaining the PV array source voltage $V_S$ less than the open-circuit voltage of the PV array 310. The DC link voltage $V_L$ is correspondingly maintained less than the open-circuit voltage of the PV array 310.

A control system can regulate the current flowing from PV array 310 during the trip condition or shutdown condition by controlling the duty cycle or switching speed of switching devices 326 in converter 320. In this manner, embodiments of the present disclosure can maintain the DC link voltage $V_L$ less than the open-circuit voltage $V_{OC}$ of the PV array 310 during shutdown conditions or during trip conditions as the PV array 310 is decoupled from the power system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A power system, comprising:
   a DC power source having an open-circuit voltage;
   a converter configured to provide DC power from said DC power source;
   an inverter configured to convert the DC power from said converter to AC power;
   a DC link coupling said converter and said inverter, said DC link having a DC link voltage; and,
   a control system configured to control the DC link voltage, wherein said control system is configured to adjust the DC link voltage before or during a transient condition to maintain the DC link voltage less than an open-circuit voltage for the DC power source, and
   wherein said control system is configured to adjust the DC link voltage from a first voltage level to a second voltage level by inputting reactive power to the inverter from an AC grid.

2. The power system of claim 1, wherein the transient condition comprises coupling the DC power source to the converter.

3. The power system of claim 1, wherein the transient condition comprises decoupling the DC power source to the converter.

4. The power system of claim 1, wherein said control system is configured to adjust the DC link voltage from a first voltage level to a second voltage level by overmodulating the inverter.

5. The power system of claim 4, wherein said control system is configured to control the converter to maintain the DC link voltage less than the open-circuit voltage of the DC power source as the DC power source is being decoupled.

6. A control method for a power converter system, the power converter system comprising a converter configured to provide DC power from a DC power source, an inverter configured to convert the DC power provided by the converter to AC power, and a DC link having a DC link voltage coupling the converter and the inverter, the method comprising:
   operating the DC link voltage at a first voltage level;
   generating an open-circuit voltage at the DC power source;
   adjusting the DC link voltage from the first voltage level to a second voltage level, the second voltage level being less than the first voltage level;
   coupling the DC power source to the power converter system;
   providing DC power to the DC link from the DC power source; and,
   converting the DC power on the DC link to AC power,
   wherein adjusting the DC link voltage from the first voltage level to a second voltage level comprises inputting reactive power to the inverter from an AC grid.

7. The method of claim 6 wherein after converting the DC power on the DC link to AC power, the method comprises controlling the DC link voltage to be less than the open-circuit voltage of the DC power source.

8. The method of claim 6, wherein the first voltage level and the second voltage level are less than the open-circuit voltage of the DC power source.

9. The method of claim 6, wherein adjusting the DC link voltage from the first voltage level to a second voltage level comprises varying an operating point for the inverter.

10. The method of claim 6, wherein adjusting the DC link voltage from the first voltage level to a second voltage level comprises overmodulating the inverter.

11. The method of claim 6, wherein coupling the DC power source to the power converter system comprises closing a circuit breaker.

12. The method of claim 6, wherein the method further comprises:
   decoupling the DC power source from the power converter system; and,
   controlling the converter to maintain the DC link voltage less than the open-circuit voltage of the DC power source as the DC power source is being decoupled.

13. The method of claim 12, wherein decoupling the DC power source comprises opening a circuit breaker located between the DC power source and the converter.

14. The method of claim 12, wherein controlling the converter comprises shorting the DC power source through a switching device in the converter.

15. A control method for a power converter system, the power converter system comprising a converter configured to provide DC power from a DC power source, an inverter configured to convert the DC power provided by the converter to AC power, and a DC link having a DC link voltage coupling the converter and the inverter, the method comprising:
   providing DC power to the DC link from the DC power source;
   converting the DC power of the DC link to AC power;
   controlling the DC link voltage to be less than the open-circuit voltage of the DC power source by controlling the output of the inverter;
   decoupling the DC power source from the power converter system; and
   controlling the converter to maintain the DC link voltage less than the open-circuit voltage of the DC power source as the DC power source is being decoupled.

16. The method of claim 15, wherein decoupling the DC power source comprises opening a circuit breaker located between the DC power source and the converter.

17. The method of claim 16, wherein controlling the converter comprises shorting the DC power source through a switching device in the converter.

18. The method of claim 17, wherein controlling the converter comprises controlling the switching speed of the switching device.

* * * * *